(12) United States Patent
Drake et al.

(10) Patent No.: US 6,975,930 B2
(45) Date of Patent: Dec. 13, 2005

(54) RATE LIMITING CONTROL SYSTEM

(75) Inventors: Benjamin D. Drake, Metamora, IL (US); Timothy M. Gutzwiller, Dunlap, IL (US); Michael F. Coffman, Metamora, IL (US); Timothy A Feucht, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/636,624

(22) Filed: Aug. 8, 2003

(65) Prior Publication Data

US 2005/0033498 A1 Feb. 10, 2005

(51) Int. Cl.[7] ............................. G06F 19/00; G06G 7/00
(52) U.S. Cl. ........................... 701/51; 701/50; 180/334; 74/479.01; 74/490.15; 172/10
(58) Field of Search ............................. 701/50, 1, 110, 701/51, 53, 102, 115; 791/67; 172/2–3, 4, 172/5, 7–9, 10; 74/335, 471 R, 473.1, 473.16, 74/473.17, 473.3, 479.01, 480 R, 490.12, 74/490.14, 490.15, 731.1, 733.1; 180/337, 180/338, 315, 316, 333, 334, 336; 91/361–362, 91/364–366, 369; 700/17–19, 46, 83, 85

(56) References Cited

U.S. PATENT DOCUMENTS

| | | | |
|---|---|---|---|
| 4,634,887 A | | 1/1987 | Balch et al. .................... 290/3 |
| 5,040,648 A | * | 8/1991 | Mitchell et al. ............ 192/3.58 |
| 5,335,487 A | * | 8/1994 | Murakawa et al. .......... 56/10.5 |
| 5,553,453 A | * | 9/1996 | Coutant et al. ............... 60/327 |
| 5,636,119 A | * | 6/1997 | Coutant et al. ............... 701/51 |
| 5,887,669 A | * | 3/1999 | Ostler et al. ............... 180/53.4 |
| 6,016,875 A | * | 1/2000 | Orbach et al. .................. 172/2 |
| 6,021,370 A | | 2/2000 | Bellinger et al. ............ 701/110 |
| 6,030,315 A | * | 2/2000 | Bellinger ..................... 477/121 |
| 6,038,504 A | * | 3/2000 | Cronin et al. ................. 701/51 |
| 6,041,867 A | * | 3/2000 | Orbach et al. .................. 172/2 |
| 6,058,343 A | * | 5/2000 | Orbach et al. ................ 701/50 |
| 6,115,660 A | * | 9/2000 | Berger et al. ................. 701/50 |
| 6,233,511 B1 | * | 5/2001 | Berger et al. ................. 701/50 |
| 6,260,440 B1 | * | 7/2001 | Cronin et al. .............. 74/733.1 |
| 6,559,612 B2 | | 5/2003 | Baumgarten ................ 318/482 |
| 6,561,076 B2 | * | 5/2003 | Hou et al. ..................... 91/443 |
| 6,581,710 B2 | * | 6/2003 | Sprinkle et al. ............ 180/178 |
| 6,601,670 B2 | * | 8/2003 | Kaneda et al. ............. 180/333 |
| 2002/0054568 A1 | | 5/2002 | Hoogenboom et al. .. 370/235.1 |
| 2003/0172757 A1 | * | 9/2003 | Yone ........................... 74/335 |
| 2004/0140145 A1 | * | 7/2004 | Chernoff et al. ............ 180/333 |

* cited by examiner

*Primary Examiner*—Jacques H. Louis-Jacques
(74) *Attorney, Agent, or Firm*—Finnegan, Henerson, Farabo, Garrett & Dunner LLP

(57) ABSTRACT

A method of controlling an operation of a mechanism is provided. A first rate limit is assigned to a first input device that is operable to generate a first signal to control the operation of the mechanism. A second rate limit is assigned to a second input device that is operable to generate a second signal to control the operation of the mechanism. At least one of the first and second input devices are manipulated to effect a desired change in the operation of the mechanism. A maximum allowable rate of change in the operation of the mechanism is identified based on the first and second signals and the first and second rate limits. A rate of change in the operation of the mechanism to achieve the desired change in the operation of the mechanism is determined based on a comparison of the maximum allowable rate of change in the operation of the mechanism with a last used rate of change in the operation of the mechanism.

21 Claims, 2 Drawing Sheets

RATE LIMITING CONTROL SYSTEM

TECHNICAL FIELD

The present invention is directed to a control system and, more particularly, to a rate limiting control system.

BACKGROUND

Many different applications may use a control system to govern the operation of a controllable mechanism. The control system may control the mechanism based on one or more input signals that may be received from an input mechanism or from sensors. These input signals may include information such as, for example, operational instructions from an operator, that indicate a desired operation of the controllable mechanism. The control system may process these input signals and deliver an appropriate command signal to the mechanism. The command signal may, for example, result in an increase or decrease in the operational speed of the controllable mechanism.

As described in U.S. Pat. No. 6,559,612 to Baumgarten, a control system may be programmed to control the rate at which a particular command is applied to the associated mechanism. The '612 patent describes a control system that controls the motion of a steering mechanism in response to instructions from an operator. The control system assigns a rate limit to the operation of the steering mechanism. The rate limit defines an acceptable rate of change in the operation of the steering mechanism over a given time period. The control system compares the instructions from the operator and, if the requested operation exceeds the rate limit, limits the requested operational change to be within the defined rate limit.

In some applications, however, the control system may receive several different inputs that may impact the operation of a controllable mechanism. For example, a vehicle, such as a work machine, may include several input mechanisms that allow an operator to control the motion of the vehicle. A manipulation of any one of these input mechanisms, which may be, for example, a joystick, a speed-up button, a speed-down button, or a brake pedal, may act to alter the operation of a power source and transmission on the vehicle.

In these types of applications, it may be desirable to apply a different rate limit to the transmitted command signal depending upon the input source of the instruction. For example, in a work machine, it may be desirable to allow the work machine to accelerate at one rate in response to a manipulation of a joystick and to accelerate at a second rate in response to a manipulation of a speed-up button. This may be accomplished by assigning a different rate limit to each input source.

In some circumstances, the operator may cause multiple, conflicting operational instructions to be transmitted to the control system. For example, the operator may step on the brake and move the joystick to a forward position at substantially the same time. This may cause two conflicting operational instructions to be transmitted to the control system. The control system may not process the conflicting commands properly, which may result in an unexpected operation. For example, the work machine may start to move when the operator expects the work machine to remain stationary.

The control system of the present disclosure solves one or more of the problems set forth above.

SUMMARY OF THE INVENTION

One aspect of the present disclosure is directed to a method of controlling an operation of a mechanism. A first rate limit is assigned to a first input device that is operable to generate a first signal to control the operation of the mechanism. A second rate limit is assigned to a second input device that is operable to generate a second signal to control the operation of the mechanism. At least one of the first and second input devices are manipulated to effect a desired change in the operation of the mechanism. A maximum allowable rate of change in the operation of the mechanism is identified based on the first and second signals and the first and second rate limits. A rate of change in the operation of the mechanism to achieve the desired change in the operation of the mechanism is determined based on a comparison of the maximum allowable rate of change in the operation of the mechanism with a last used rate of change in the operation of the mechanism.

Another aspect of the present disclosure is directed to a control system for a mechanism. A first input device is operable to generate a first signal to control the operation of the mechanism. A second input device is operable to generate a second signal to control the operation of the mechanism. A control has a memory that is adapted to store a first rate limit associated with the first input device, a second rate limit associated with the second input device, and a last used rate limit associated with the operation of the mechanism,. The control identifies a desired change in the operation of the mechanism based on the first and second signals and identifies a maximum allowable rate of change in the operation of the mechanism based on the first and second signals and the first and second rate limits. The control also determines a rate of change in the operation of the mechanism to achieve the desired change in the operation of the mechanism based on a comparison of the maximum allowable rate of change in the operation of the mechanism with the last used rate of change in the operation of the mechanism.

DETAILED DESCRIPTION

Figure 1:
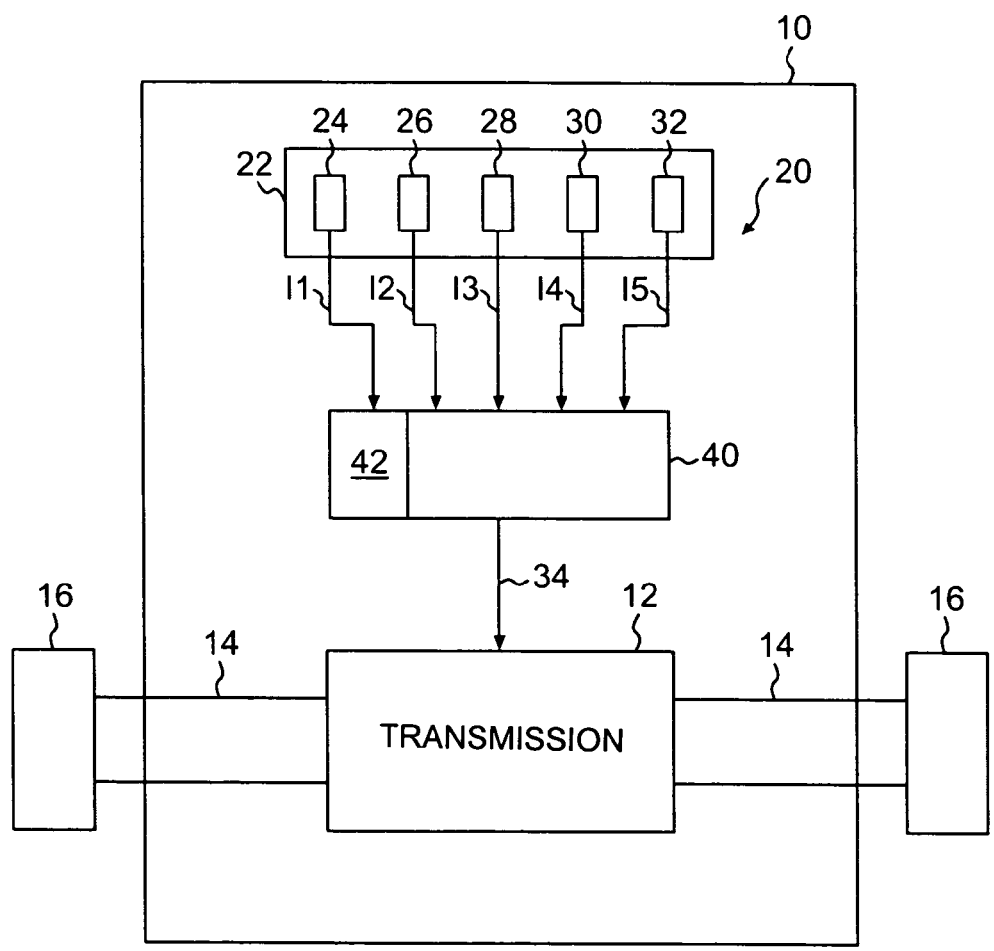
FIG. 1 is a schematic and diagrammatic representation of a work machine having control system in accordance with an exemplary embodiment of the present invention.

An exemplary embodiment of a rate limiting control system 20 is schematically and diagrammatically illustrated in FIG. 1. For the purposes of the present disclosure, control system 20 is depicted and described in connection with a continuously variable transmission 12 on a work machine 10. Transmission 12 may be an electrically-driven continuously variable transmission or a hydraulically-driven continuously variable transmission.

A continuously variable transmission is typically driven by a power source and includes a driving element and a driven element. The power source may be an internal combustion engine. In a hydraulic continuously variable transmission, the driving element is a hydraulic pump and the driven element is a hydraulic motor. In a electric continuously variable transmission, the driving element is an electric generator and the driven element is an electric motor.

Transmission 12 may be disposed between the power source (not shown) and a traction device 16, which may be any commonly used traction device, such as wheels, tracks, or belts. The transmission 12 may be operated to transmit the power generated by the power source into a rotation of a drive shaft 14 that is connected to traction device 16 to thereby propel work machine 10. The ratio of the transmission and the torque generated by the power source may be varied to control the direction and velocity of movement of work machine 10.

Control system 20 may include an interface 22 that is adapted to provide control over the operation of work machine 10, including the operation of transmission 12. Interface 22 may include a series of input devices 24, 26, 28, 30, and 32, which may be any type of input device that is commonly used with a work machine. For example, the series of input devices 24, 26, 28, 30, and 32 may include a joystick, a control lever, a brake pedal, an accelerator pedal, a speed up button, and/or a slow down button.

Each input device 24, 26, 28, 30, and 32 is adapted to generate and transmit an input signal I1, I2, I3, I4, and I5, respectively. Each input signal may be indicative of a manipulation of the associated input device. For example, an operator may manipulate input device 24, which may be a joystick, by moving the joystick to a forward position to instruct work machine 10 to move forward. The joystick may generate input signal I1 which indicates that the joystick has been moved to the forward position.

It is contemplated that input signals I1, I2, I3, I4, and I5 may be generated by an input devices 24, 26, 28, 30, and 32 that does not receive physical input from an operator. For example, control system 20 may issue an input signal to control the operation of transmission 12 such as, for example, a deceleration command issued in response to a failure of a component on work machine 12. In addition, one or more of input devices 24, 26, 28, 30, and 32 may be a governor or sensor that is adapted to provide an indication of an operating condition of work machine 10. For example, one of input devices 24, 26, 28, 30, and 32 may be a sensor operatively engaged with the power source or a transmission load controller.

The input signal associated with each input device 24, 26, 28, 30, and 32 may be expressed as a percentage of a maximum speed of work machine 10. For example, an input signal associated with movement of a joystick may be expressed as a range from 0% for a neutral position to 100% for a full forward position. Similarly, an input signal associated with a brake pedal may range from 0% for a depressed position to 100% for a released position.

It should be noted that one or more of input devices may be adapted to control the direction of travel of work machine 10. In this situation, the associated input signal may be expressed as a percentage of the maximum turning rate of work machine 10. For example, the range may vary from −100% to +100%. A value of −100% may indicate a maximum turning rate in a first direction, a value of 0% may indicate no turning rate, and a value of +100%, may indicate a maximum turning rate in second direction.

Control system 20 may also include a control 40 that is adapted to receive each input signal I1, I2, I3, I4, and I5. Control 40 may include a computer, which has all the components required to run an application, such as, for example, a memory 42, a secondary storage device, and a processor. One skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM. Associated with the microprocessor and part of control 40 are various other known circuits (not shown) such as, for example, power supply circuitry, signal conditioning circuitry, and solenoid driver circuitry, among others.

Control 40 may be programmed to control some or all operational aspects of work machine 10. For example, control 40 may be programmed to determine and transmit a command signal 34 to thereby govern the operation of transmission 12 based on the input signals received from interface 22. In addition, control 40 may control the operation of the power source by controlling various systems, such as a fuel delivery system, associated with the power source. Control 40 may be further programmed to control the movement of a work implement linkage to thereby move a ground engaging tool in response to instructions from the operator.

Memory 42 of control 40 may be adapted to store a series of rate limits. One rate limit may be associated with a particular input device 24, 26, 28, 30, and 32. Each rate limit may define an allowable rate of change in the operation of transmission 12 based on an input signal from the associated input device 24, 26, 28, 30, and 32. It is contemplated that at least one input device 24, 26, 28, 30, and 32 will have a rate limit that is different from the rate limits associated with the other input devices 24, 26, 28, 30, and 32. It is further contemplated that two or more input devices 24, 26, 28, 30, and 32 may have a unique rate limit.

Control 40 may process the input signals I1, I2, I3, I4, and I5 to determine a desired operation of work machine 10. Control 40 may multiply the input signals, expressed as percentages of a maximum speed, together to determine the desired operation of work machine 10. The operator may, for example, move a joystick to a full forward position and depress the brake pedal. The input signal associated with the joystick would indicate 100%, or maximum speed, and the input signal associated with the brake pedal would indicate 0%, or no movement. A multiplication of these input signals would yield a desired operation of 0%, or no movement of work machine 10. When the operator releases the brake pedal, the associated input signal would change to 100%. Accordingly, the desired operation would also change to 100%, or maximum speed of work machine 10.

Control 40 may use the rate limit associated with each input device 24, 26, 28, 30, and 32 to determine the rate at which to change the operation of transmission 12 to achieve the desired operation. Assume, for example, that input device 24 is a joystick and input signal I1 indicates that the operator has moved the joystick to the full forward position to indicate that the operator desires work machine 10 to move forward at a maximum velocity. Control 40 may access memory 42 to determine the rate limit associated with input device 24 to determine the maximum allowable acceleration of work machine 10. Control 40 may then generate and transmit command signal 34 to adjust the operation of transmission 12 to accelerate the work machine 10 at the allowable rate to thereby achieve the desired velocity.

The value of the rate limit associated with each input device 24, 26, 28, 30, and 32 may be selected to account for the different functionality associated with each input device 24, 26, 28, 30, and 32. For example, the rate limit associated with a joystick may be greater than the rate limit associated with a speed-up button. In this example, control 40 will accelerate work machine at a faster rate in response to manipulation of the joystick than in response to manipulation of the speed-up button.

The value of each rate limit may be expressed in terms of a percentage of a maximum operating speed. The percentage may indicate an allowable change in the operating speed in a given time period in response to manipulation of the associated input device 24, 26, 28, 30, and 32. For example, the rate limit associated with a joystick may be expressed as 20%. This indicates that the maximum rate of change in the velocity of transmission 12 in response to an input signal from the joystick is 20% of the maximum transmission velocity during one predetermined time period. It is contemplated that each rate limit may be expressed in other terms. For example, each rate limit may be expressed in terms of a velocity, such as, for example, rotations per minute, miles per hour, or kilometers per hour.

Memory 42 may be further adapted to store two or more rate limits for each input device 24, 26, 28, 30, and 32. Control 40 may use one rate limit to govern the rate of acceleration of work machine 10 in response to an input signal from the associated input device. Control 40 may use the second rate limit to govern the rate of deceleration of work machine 10 in response to a signal from the associated input device. The rate limit values for acceleration and deceleration for each input device 24, 26, 28, 30, and 32 may be selected to meet the needs of the particular application.

In some circumstances, an operator may manipulate more than one input device 24, 26, 28, 30, and 32 to control the operation of transmission 12 within a short period of time. For example, the operator may depress a brake pedal and move a joystick to a forward position at substantially the same time. The brake pedal and joystick will each generate an input signal to control 40 to alter the operation of transmission 12. As a different rate limit may be associated with each input signal, control 40 may be programmed to determine the appropriate rate limit to use in controlling transmission 12 in response to the input signals. An exemplary method 100 for determining the appropriate limit on a rate of operational change in transmission 12 is illustrated in the flowchart of FIG. 3 and is described in greater detail below.

INDUSTRIAL APPLICABILITY

Figure 2:
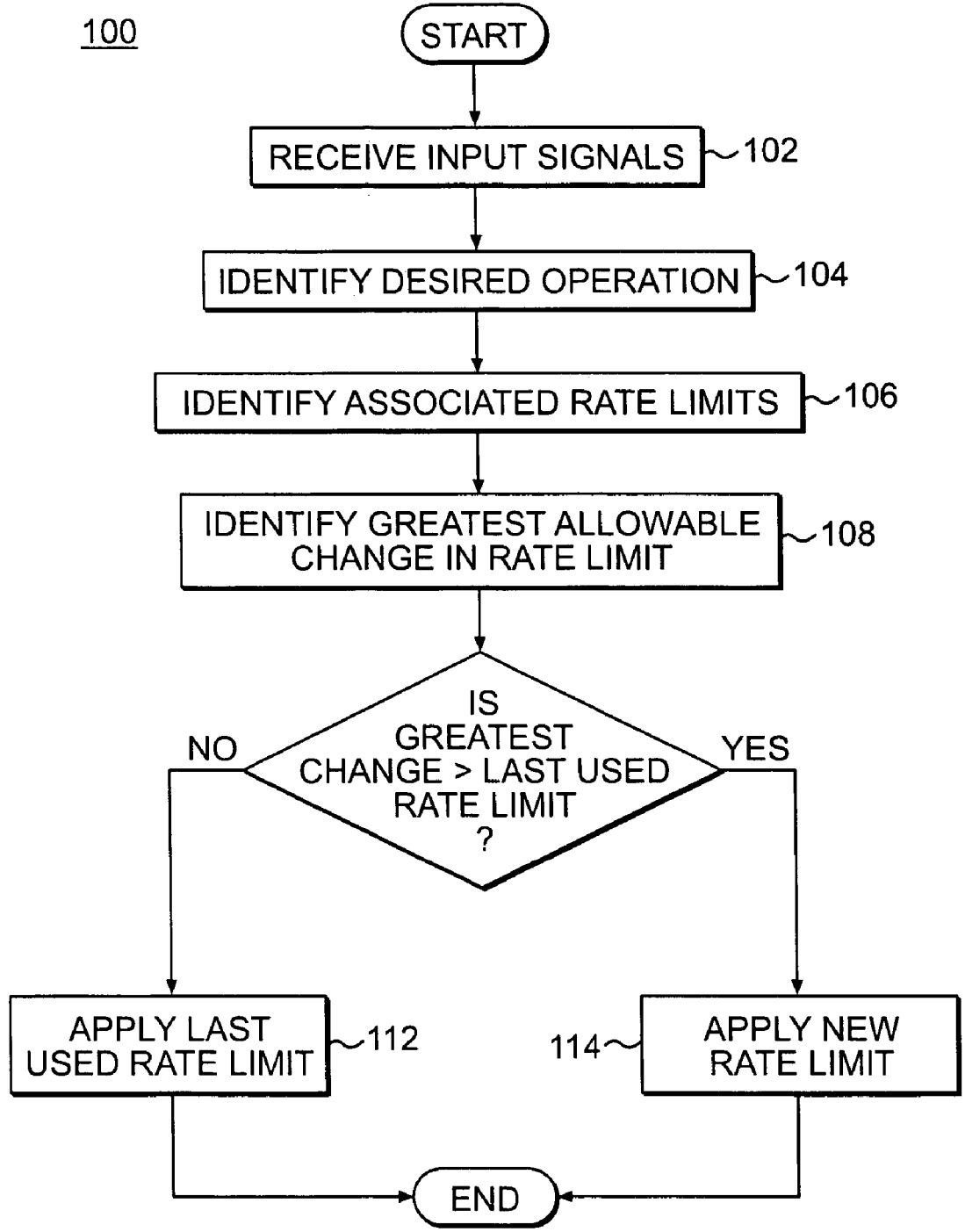
FIG. 2 is a flowchart illustrating an exemplary method of controlling a system in accordance with the present invention.

Control 40 may be programmed with a set of logical instructions to perform the steps of flowchart 100 of FIG. 2. Control 40 may perform the described method on a periodic basis at a set time interval. Alternatively, control 40 may perform the described method when a change is detected in one or more of input signals I1, I2, I3, I4, and I5.

Control 40 selectively receives input signals I1, I2, I3, I4, and I5 from interface 22. (Step 102). Each of input signals I1, I2, I3, I4, and I5 may indicate a desired operation of transmission 12 or a desired change in the operation of transmission 12. For example, input signals I1, I2, I3, I4, and I5 may indicate a desired speed or a desired change in speed of transmission 12 and/or work machine 10. Each input signal may indicate a desired percentage of the maximum speed of transmission 12 and/or work machine 10. For example, when an operator moves a joystick to the full forward position, the corresponding input signal may be 100% indicating that the operator desires maximum transmission speed. When the joystick is moved to a halfway position, the corresponding input signal may be 50%, indicating that the operator desires half of the maximum speed of transmission 12. If the corresponding input device is a brake and the operator has fully depressed the brake, the corresponding input signal may be 0%, indicating that the operator desires the transmission 12 and work machine 10 to come to a stop.

Control 40 may determine the desired operation based on input signals I1, I2, I3, I4, and I5. (Step 104). For example, the desired operation may be determined by multiplying input signals I1, I2, I3, I4, and I5, expressed in terms of percentages, together. If the joystick is fully forward and the brake pedal is depressed, I1 may be 100% and I2 may be 0%. A multiplication of these desired operating percentage yields a desired operation of 0%, or a complete stop of work machine 10. If the joystick is fully forward (100%) and the brake is released (100%), the desired operation would be 100%, or maximum speed.

Each input device 24, 26, 28, 30, and 32 may be monitored on a set time period. Control 40 may compare the current operational request from each input device 24, 26, 28, 30, and 32 to the previous operational request from the input device 24, 26, 28, 30, and 32. In this manner, control 40 may identify a desired change in the operation of transmission 12 based on the input signals received from input devices 24, 26, 28, 30, and 32.

Control 40 may determine the rate limit associated with each input signal I1, I2, I3, I4, and I5. (Step 106). The rate limit for each input device may indicate the allowable rate of change in the velocity of the transmission 12 or work vehicle 10 for a given time period in response to manipulation of the associated input device. For example, the rate limit associated with a joystick may be 20%, which indicates that the velocity of the transmission 12 or work machine 10 may change by 20% of the maximum velocity in a given time period.

As noted above, memory 42 may store an acceleration rate limit and a deceleration rate limit for each input device 24, 26, 28, 30, and 32. Control 40 may determine if the requested operational change is an acceleration or a deceleration of the work machine 10. For example, control 40 may compare the current speed with the desired operating speed. If the current speed is 50% of the maximum speed and the desired speed is 0%, a deceleration is desired. If the current speed is 50% of the maximum speed and the desired speed is 100%, an acceleration is desired. Control 40 may access memory 42 to identify the appropriate rate limit for the particular input device 24, 26, 28, 30, and 32 based on the particular input signal I1, I2, I3, I4, and I5 and the desired operational change.

Control 40 may identify a greatest allowable change in the velocity of the transmission for a given time period based on the input signals from each of the input devices 24, 26, 28, 30, and 32. (Step 108). For example, control 40 may receive an input signal from a joystick to accelerate work machine 10 from a stopped position to a maximum velocity of 10 km/hour. If the rate limit associated with the joystick is 20%, the allowable change in velocity associated with the joystick will be 20% of 10 km/h, or 2 km/h. Control 40 may perform a similar analysis with each input signal from each input device 24, 26, 28, 30, and 32. In this manner, control 40 may determine the maximum allowable change in the velocity of transmission 12 for a given time period.

Control 40 may compare the maximum allowable change in the velocity of transmission 12 with a last used rate limit. (Step 110). If, for example, work machine 10 was in a stationary position in the previous time period, the last used rate limit would be 0. Alternatively, if, in the previous time period, work machine 10 was accelerating at a rate of 30% of the maximum speed, or 3 km/h, the last used rate limit would be 3 km/h.

If the maximum allowable change in the velocity of transmission 12 for a time period, as determined in step 108, is less than the last used rate limit, control 40 will continue to apply the last used rate limit to govern the rate of change in the operation of transmission 12. (Step 112). Using the above example, if the maximum allowable change is 2 km/h and the last used rate limit is 3 km/h, control 40 will continue to accelerate work machine 10 at 3 km/h for each time period.

If the maximum allowable change in the velocity of transmission 12 for a time period, as determined in step 108, is greater than the last used rate limit, control 40 will apply the new rate limit to govern the rate of change in the operation of transmission 12. (Step 114). If the maximum allowable change is 2 km/h and the last used rate limit is 0 km/h, control 40 will begin to accelerate work machine 10 at 2 km/h.

Control 40 may continue to apply the selected rate limit until the operational instruction associated with the manipulated input device 24, 26, 28, 30, and 32 is met or until the operator manipulates an input device having a greater late limit. For example, the operator may move a joystick having a rate limit of 2 km/h to a full forward position to thereby cause work machine 10 to accelerate to a maximum speed of 10 km/h. Control 40 will govern the operation of transmission 12 to accelerate work machine 10 at 2 km/h per time period until the maximum speed of 10 km/h is reached. However, the operator may manipulate a second input device 26, such as a speed-up button, that has a greater associated rate limit during the acceleration of work machine 10 in response to the joystick movement. Control 40 will identify the new instruction and compare the rate limits of the manipulated input devices. Control 40 will identify the greater rate limit of the speed-up button and apply the new rate limit to the acceleration of work machine 10. Accordingly, control 40 will increase the acceleration of work machine to 3 km/h per time period until the maximum speed of 10 km/h is reached.

Control 40 may apply the same rate limiting principles described above to a deceleration of work machine 10. For example, when work machine 10 is traveling at a maximum speed of 10 km/h, the operator may move the joystick having a deceleration rate limit of 3 km/h to a neutral position to thereby cause work machine 10 to decelerate to a stopped position. Control 40 will govern the operation of transmission 12 to decelerate work machine 10 at 3 km/h per time period until work machine 10 reaches the stopped position. However, the operator may subsequently manipulate third input device 28, such as a brake, that has a deceleration rate limit of 5 km/h. Control 40 will identify the new instruction and compare the rate limits of the manipulated input devices. Control 40 will identify the greater deceleration rate limit of the brake and apply the new rate limit to the deceleration of work machine 10. Accordingly, control 40 will decelerate work machine at 5 km/h per time period until work machine 10 reaches the stopped position.

While the control system of the present disclosure has been described in connection with a continuously variable transmission for a work machine, it is contemplated that the described control system may be incorporated with another application. For example, the described control system may be used with another type of vehicle, such as an automobile. In addition, it is contemplated that the control system described herein may be used with any type of application in which a control system governs the operation of a controllable mechanism based on multiple input signals.

It will be apparent to those skilled in the art that various modifications and variations can be made in the described control system without departing from the scope of the present disclosure. Other embodiments of the disclosed control system will be apparent to those skilled in the art from consideration of the specification and practice of the control system disclosed herein. It is intended that the specification and examples be considered as exemplary only, with a true scope being indicated by the following claims and their equivalents.

What is claimed is:

1. A method of controlling an operation of a mechanism, comprising:
   assigning a first rate limit to a first input device operable to generate a first signal to control the operation of the mechanism;
   assigning a second rate limit to a second input device operable to generate a second signal to control the operation of the mechanism;
   manipulating at least one of the first and second input devices to effect a desired change in the operation of the mechanism;
   identifying a maximum allowable rate of change in the operation of the mechanism based on the first and second signals and the first and second rate limits; and
   determining a rate of change in the operation of the mechanism to achieve the desired change in the operation of the mechanism based on a comparison of the maximum allowable rate of change in the operation of the mechanism with a last used rate of change in the operation of the mechanism.

2. The method of claim 1, wherein the selected one of the first and second rate limits corresponds to the manipulated input device.

3. The method of claim 1, further including changing the value of the last used rate of change in the operation of the mechanism to the value of the maximum allowable rate of change when the maximum allowable rate of change is greater than the last used rate of change.

4. The method of claim 1, further including limiting the rate of change in the operation of the mechanism to the maximum allowable rate of change when the maximum allowable rate of change is greater than the last used rate of change.

5. The method of claim 1, further including assigning a third rate limit to the first input device, wherein the first rate limit represents a limit on an acceleration of the mechanism in response to a manipulation of the first input device and the third rate limit represents a limit on a deceleration of the mechanism in response to a manipulation of the first input device, wherein the first and third rate limits have different values.

6. The method of claim 1, further including:
   expressing each of the first and second signals as a percentage of a maximum operating speed;
   determining a desired operation of the mechanism by multiplying the first signal and second signals; and
   comparing a current operation of the mechanism with the desired operation of the mechanism to determine the desired change in operation of the mechanism.

7. A control system for a mechanism, comprising:
   a first input device operable to generate a first signal to control the operation of the mechanism;
   a second input device operable to generate a second signal to control the operation of the mechanism; and a control having a memory adapted to store a first rate limit associated with the first input device, a second rate limit associated with the second input device, and a last used rate limit associated with the operation of the mechanism, the control operable to identify a desired change in the operation of the mechanism based on the first and second signals, to identify a maximum allowable rate of change in the operation of the mechanism based on the first and second signals and the first and second rate limits, and to determine a rate of change in the operation of the mechanism to achieve the desired change in the operation of the mechanism based on a comparison of the maximum allowable rate of change in the operation of the mechanism with the last used rate of change in the operation of the mechanism.

8. The system of claim 7, wherein the memory is adapted to store a third rate limit associated with the first input device and a fourth rate limit associated with the second input device.

9. The system of claim 7, wherein the control monitors the first and second signals at periodic intervals based on a predetermined time period.

10. The system of claim 7, wherein the desired change in the operation of the mechanism is one of an acceleration request and a deceleration request.

11. The system of claim 7, wherein each of the first rate limit and the second rate limit are expressed as a percentage of a maximum operating speed of the mechanism.

12. The system of claim 7, wherein the first rate limit indicates a first maximum percentage change in the operating speed of the mechanism over a predetermined time period in response to the first control signal from the first input device and the second rate limit indicates a second maximum percentage change in the operating speed of the mechanism over the predetermined time period in response to the second control signal from the second input device.

13. The system of claim 7, further including a plurality of input devices and wherein the memory of the control is adapted to store at least one rate limit for each of the plurality of input devices.

14. A work machine, comprising:
a controllable mechanism;
a first input device operable to generate a first signal to control the operation of the mechanism;
a second input device operable to generate a second signal to control the operation of the mechanism; and
a control having a memory adapted to store a first rate limit associated with the first input device, a second rate limit associated with the second input device, and a last used rate limit associated with the operation of the mechanism, the control operable to identify a desired change in the operation of the mechanism based on the first and second signals, to identify a maximum allowable rate of change in the operation of the mechanism based on the first and second signals and the first and second rate limits, and to determine a rate of change in the operation of the mechanism to achieve the desired change in the operation of the mechanism based on a comparison of the maximum allowable rate of change in the operation of the mechanism with the last used rate of change in the operation of the mechanism.

15. The work machine of claim 14, wherein the controllable mechanism is a continuously variable transmission.

16. The work machine of claim 15, wherein the continuously variable transmission is one of a hydraulically driven transmission and an electrically driven transmission.

17. The work machine of claim 15, wherein the desired change is one of an acceleration of the continuously variable transmission and a deceleration of the continuously variable transmission.

18. The work machine of claim 15, wherein each of the first rate limit and the second rate limit are expressed as a percentage of a maximum operating speed of the of the continuously variable transmission.

19. The work machine of claim 14, wherein the memory is adapted to store a third rate limit associated with the first input device and a fourth rate limit associated with the second input device.

20. The work machine of claim 14, wherein the first input device is a joystick and the second input device is a speed adjustment button.

21. A control system for a mechanism, comprising:
a first input means for generating a first input signal to control the operation of the mechanism;
a second input means for generating a second input signal to control the operation of the mechanism; and
a control means having a memory means for storing a first rate limit associated with the first input device, a second rate limit associated with the second input device, and a last used rate limit associated with the operation of the mechanism, the control means operable to identify a desired change in the operation of the mechanism based on the first and second signals, to identify a maximum allowable rate of change in the operation of the mechanism based on the first and second signals and the first and second rate limits, and to determine a rate of change in the operation of the mechanism to achieve the desired change in the operation of the mechanism based on a comparison of the maximum allowable rate of change in the operation of the mechanism with the last used rate of change in the operation of the mechanism.

* * * * *